Figure 1:
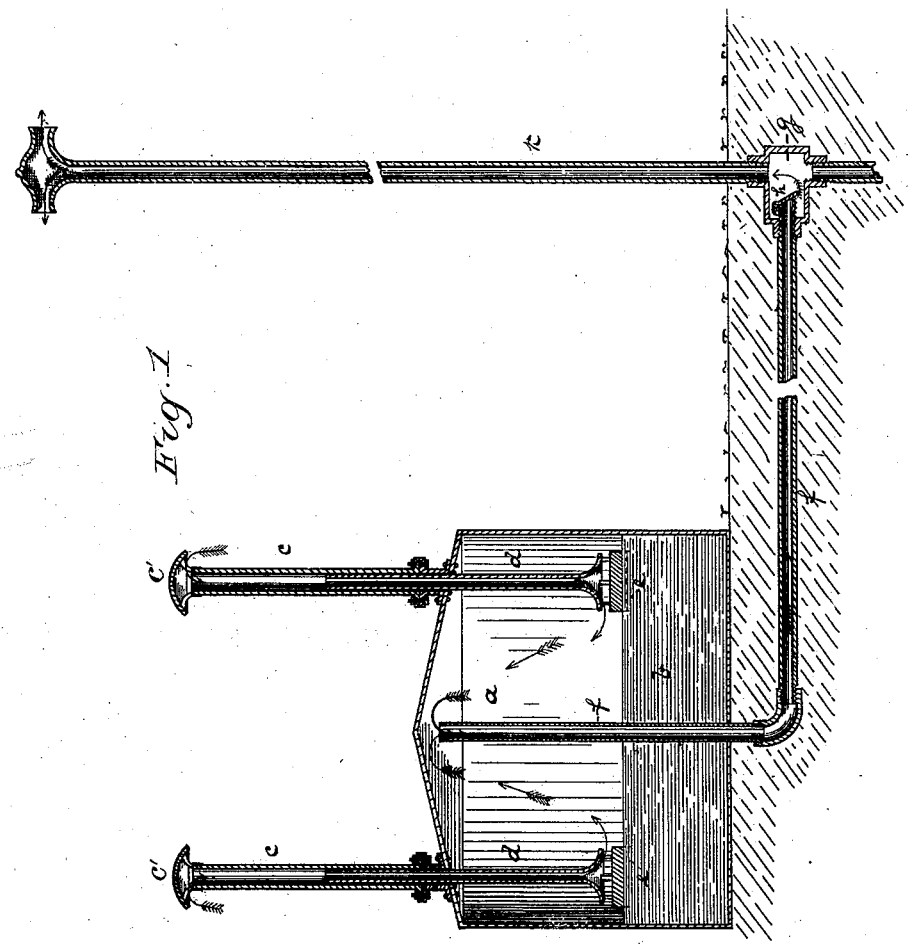

(No Model.)

2 Sheets—Sheet 1.

J. P. REINECKE.
METHOD OF PREVENTING THE ACCUMULATION OF INFLAMMABLE GASES IN OIL TANKS.

No. 291,084.

Patented Jan. 1, 1884.

(No Model.) 2 Sheets—Sheet 2.

J. P. REINECKE.
METHOD OF PREVENTING THE ACCUMULATION OF INFLAMMABLE GASES IN OIL TANKS.

No. 291,084. Patented Jan. 1, 1884.

Witnesses
Thomas W. Bakewell
R. C. Wrenshall

Inventor
John P. Reinecke
by his attorneys
Bakewell & Kerr

UNITED STATES PATENT OFFICE.

JOHN P. REINECKE, OF PITTSBURG, PENNSYLVANIA.

METHOD OF PREVENTING THE ACCUMULATION OF INFLAMMABLE GASES IN OIL-TANKS.

SPECIFICATION forming part of Letters Patent No. 291,084, dated January 1, 1884.

Application filed August 2, 1883. (No model.)

*To all whom it may concern:*

Be it known that I, JOHN P. REINECKE, of the city of Pittsburg, in the county of Allegheny and State of Pennsylvania, have invented a new and useful Improvement in Method of Preventing the Accumulation of Inflammable Gases in Oil-Tanks; and I do hereby declare the following to be a full, clear, and exact description thereof.

My invention relates to an improved method of preventing the accumulation of inflammable gases in oil-tanks; and it consists in causing an induced current of air to pass through the tank above the surface of the oil.

It is well known that the gases developed or evolved from the oil in oil-tanks are often of two classes—viz., those which are heavier than the air and those which are lighter. Therefore in applying my invention the flow of the gases may be rendered automatic in two ways— in the case of the lighter gases by displacement and a draft such as can be produced by a stack or like means, and in the case of the heavier gases, either in a like manner by displacement and a draft, or by siphonic action and displacement; and although for purposes of clearness of illustration, such devices as I employ have been shown in the drawings, forming part of this specification, only as applied to separate tanks, yet it is evident that they may be all applied to a single tank, each separate series being provided with opening and closing devices, by means of which the induced current of air is prevented from passing through either of the series, and allowed to pass freely through the other.

The essential features of the apparatus employed by me are an inlet for the air, arranged so as to deliver the air at the desired point in the tank, (either at the surface of the oil, beneath the gases, or at the top of the tank above the gases, according as to whether the specific gravity of the gases is less or greater than the specific gravity of the air,) an outlet and conduit for gases, arranged either at the surface of the oil or at the top of the tank, and a discharge-orifice in the conduit, preferably situated at a point distant from the tank, and arranged on such a level with relation to the gas in the tank as to produce a draft or siphonic action.

It is well known that there is great danger of fire in oil-tanks, owing to the inflammable hydrocarbon gases which rise from the oil and collect in the upper part of the tank.

The object of my invention is to remove these gases, and thereby lessen the danger of fire.

I will now describe my invention, so that others skilled in the art to which it appertains may apply the same, reference being had to the accompanying drawings, forming part of this specification, in which—

Figure 2:
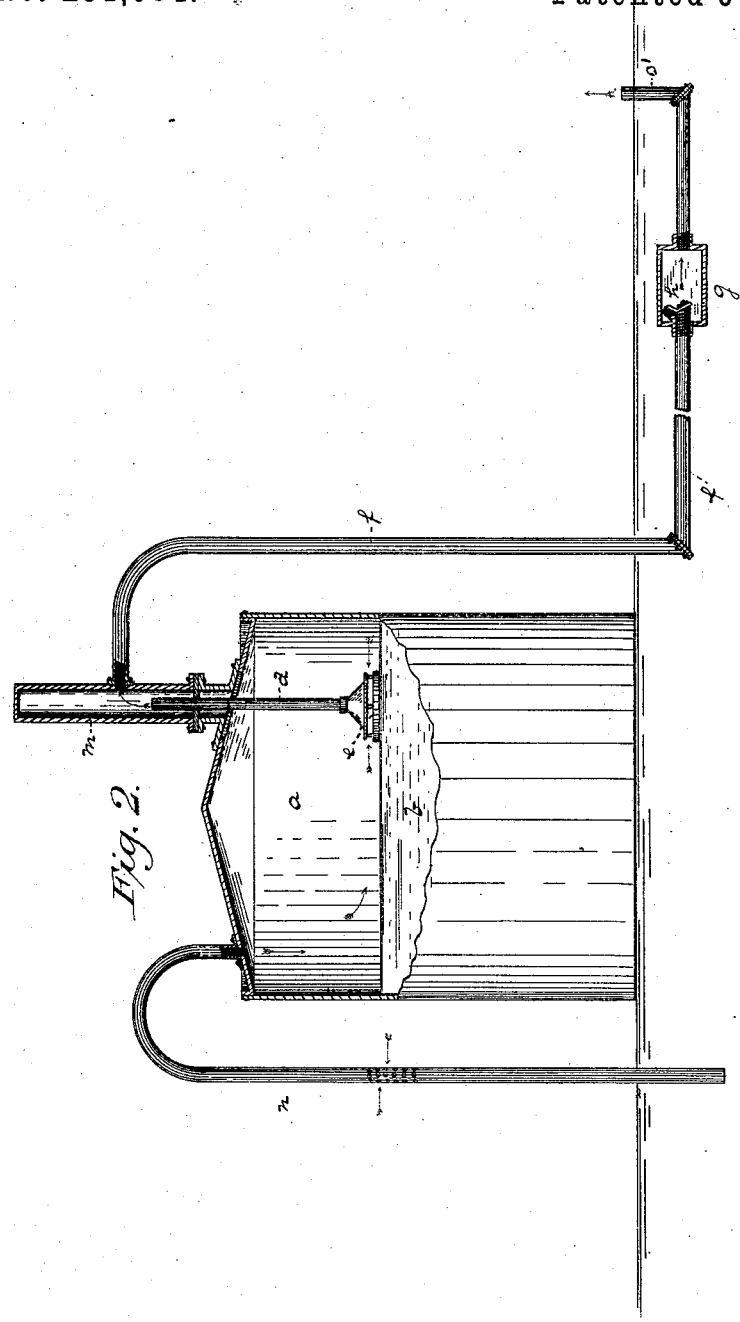

Figure 1 is a sectional elevation of the apparatus arranged to draw the gas from the upper part of the tank; and Fig. 2 is a sectional elevation of the apparatus arranged to draw the gas from the tank at the surface of the oil.

Like letters of reference indicate like parts wherever they occur.

In the drawings, $a$ represents the tank, in the lower part of which is the oil $b$. Inside of the tank $a$, resting on the surface of the oil are floats $e$, to which floats pipes $d$ are secured in such a manner as to leave their lower ends open. These pipes $d$ extend upward from the floats $e$ through openings in the top of the tank $a$ into the stacks $c$, which are secured to the roof of the tank. The pipes $d$ and stacks $c$ are joined telescopically, so as to allow the pipes $d$ to rise and fall in the stacks $c$ when the floats $e$ rise or fall in the tank $a$ as oil is supplied to or drawn from the tank, the joint being sufficiently tight to prevent the passage of air therethrough into the upper portion of the tank. The upper ends of the pipes $d$ are open in the stacks $c$. The stacks $c$ extend from the roof of the tank $a$ upward, and are preferably equal in length to the height of the tank $a$. Hoods $c'$ are secured to the stacks $c$ over their upper open end, the purpose of which is to prevent currents of air blowing sharply across the mouths of the stacks, and yet permit air to enter the mouths of the stacks under the hoods.

Instead of forming the stacks $c$ equal in length to the height of the tank, shorter stacks may be employed by forming the pipes $d$ in two or more sections telescopically united.

Inside of the tank $a$ is a pipe, $f$, the upper end of which opens at a point inside of and at or near the top of the tank. From this point the pipe $f$ extends down through the tank $a$ to a point under the surface of the ground, and thence horizontally to a point distant from the tank, where it opens into a valve-chamber, $g$, in which is a valve, $h$, which permits the gas to pass from the pipe $f$ into the chamber $g$, but prevents a backward flow of gas from the chamber into the pipe. Opening into the chamber $g$ and extending therefrom upward to a point above the level of the tops of the stacks $c$ is a stack, $k$, open at its upper end. This stack $k$ also extends downward into the ground below the level of the chamber $g$, so as to conduct the electricity away from the valve-chamber $g$ and pipe $f$, should the stack be struck by lightning. Over the upper end or mouth of the stack $k$ wire-gauze is placed, of a sufficiently close mesh to prevent the passage of flame therethrough. Gauze may also be placed over the end of the pipe $f$ in the valve-chamber $g$.

The operation is as follows: Air passes through the mouths of the stacks $c$, under the hood $c'$, down through the stacks into the pipes $d$, through the lower open ends thereof into the tank $a$, over the surface of the oil and below the body of gas in the tank, as shown by the arrows in the drawings. At the same time the gases in the tank $a$ pass into the pipe $f$, through the pipe $f$ and chamber $g$, into and through the stack $k$, and out into the atmosphere through the mouth of the stack. In case it should be desired to employ these gases as fuel at a point below the level of the gas in the tank $a$, a current or blast of air is forced into the tank through the stacks $c$, by which the gases are driven from the tank through the pipe $f$ into chamber $g$, and are conducted thence to the desired point by a suitable conduit or pipe.

Where the hydrocarbon gases in the tank are heavier than the atmosphere, the modified form of apparatus shown in Fig. 2 of the drawings may be employed. Extending upward from the top of the tank $a$ is a cylinder or pipe, $m$, the upper end of which is closed. Passing from the lower end or bottom of the cylinder $m$ into the tank is a pipe, $d$, similar to the pipes $d$, already described, fitting telescopically in the cylinder $m$, open at its lower end, and supported by a float, $e$. At the top of the tank $a$ is an opening, from which a pipe, $n$, extends down outside of the tank into and below the surface of the ground. In this pipe $n$ are holes or perforations $o$. Opening into and extending from the cylinder $m$ is a pipe, $f$, which extends horizontally under the surface of the ground and discharges into a valve-chamber, $g$, in a like manner as the pipe $f$, already described. Communicating with the chamber $g$ is a pipe, $o'$, which extends upward, and is provided with a discharge-orifice at or above the surface of the ground, below the level of the oil in the tank $a$, so that by this device a siphon is formed which, having been started by forcing air into the tank $a$ through the pipe $n$, leads the gases out of and away from the tank. The air, passing through the perforations $o$ into the pipe $n$ and thence into the tank $a$, displaces the heavier gases, which pass through the open end of the pipe $d$ into the cylinder $m$, and thence through the pipe $f$, chamber $g$, and pipe $o'$ into the atmosphere. In either or both forms of apparatus shown and described the operation may be aided by either forcing air into the tank $a$ through the air-supply pipes or by pumping the gas from the end of the gas-discharge pipes. In the second form of apparatus, instead of the discharge-orifice being situated below the level of the gases in the tank, as shown in the drawings, the pipe $f$ may be connected with a stack similar to the stack $k$, so as to cause an induced current by means of the draft through the stack instead of by means of siphonic action. All of these devices may be applied to a single tank by placing stop-cocks or valves in the inlet and conduit pipes, so that either device may be closed and the other opened.

The advantages of my invention are that the inflammable gases are drawn away from the tank and the danger of fire from the igniting of the same, either by lightning or other causes, is greatly lessened.

I do not herein limit myself to any special form of apparatus; nor do I herein claim the apparatus shown and described, as the same is made the subject-matter of an application filed November 22, 1883, Serial No. 112,503.

Having thus described my invention, what I claim, and desire to secure by Letters Patent, is—

The herein-described method of preventing the accumulation of inflammable gases in an oil-tank, by an induced current of air entering the tank and displacing the gases, substantially as and for the purposes specified.

In testimony whereof I have hereunto set my hand this 28th day of July, A. D. 1883.

JNO. P. REINECKE.

Witnesses:
CHARLES S. CRAWFORD,
JNO. K. SMITH.